United States Patent
Kowalski et al.

(10) Patent No.: US 11,127,225 B1
(45) Date of Patent: Sep. 21, 2021

(54) FITTING 3D MODELS OF COMPOSITE OBJECTS

(71) Applicant: Microsoft Technology Licensing, LLC, Redmond, WA (US)

(72) Inventors: Marek Adam Kowalski, Cambridge (GB); Virginia Estellers Casas, Cambridge (GB); Thomas Joseph Cashman, Cambridge (GB); Charles Thomas Hewitt, Cambridge (GB); Matthew Alastair Johnson, Cambridge (GB); Tadas Baltrušaitis, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/889,142

(22) Filed: Jun. 1, 2020

(51) Int. Cl.
*G06T 19/20* (2011.01)
*G06T 19/00* (2011.01)
*G06N 3/08* (2006.01)
*G06N 3/04* (2006.01)

(52) U.S. Cl.
CPC ........... *G06T 19/20* (2013.01); *G06N 3/0454* (2013.01); *G06N 3/088* (2013.01); *G06T 19/006* (2013.01); *G06T 2200/04* (2013.01); *G06T 2219/2008* (2013.01)

(58) Field of Classification Search
None
See application file for complete search history.

(56) References Cited

U.S. PATENT DOCUMENTS

| | | | |
|---|---|---|---|
| 6,919,892 B1* | 7/2005 | Cheiky | G06T 13/40 345/473 |
| 7,756,325 B2 | 7/2010 | Vetter et al. | |
| 9,547,908 B1 | 1/2017 | Kim et al. | |
| 9,864,901 B2 | 1/2018 | Chang | |
| 9,928,601 B2 | 3/2018 | Aarabi | |
| 2014/0119642 A1 | 5/2014 | Lee et al. | |

OTHER PUBLICATIONS

Aarabi, Parham, "Automatic Segmentation of Hair in Images", In Proceedings of IEEE International Symposium on Multimedia (ISM), Dec. 14, 2015, pp. 69-72.

Balan, et al., "The Naked Truth: Estimating Body Shape Under Clothing", In Proceedings of 10th European Conference on Computer Vision, Oct. 12, 2008, pp. 1-14.

(Continued)

*Primary Examiner* — Robert J Craddock

(57) ABSTRACT

A method of fitting a three dimensional (3D) model to input data is described. Input data comprises a 3D scan and associated appearance information. The 3D scan depicts a composite object having elements from at least two classes. A texture model is available which, given an input vector, computes, for each of the classes, a texture and a mask. A joint optimization is computed to find values of the input vector and values of parameters of the 3D model, where the optimization enforces that the 3D model, instantiated by the values of the parameters, gives a simulated texture which agrees with the input data in a region specified by the mask associated with the 3D model; such that the 3D model is fitted to the input data.

20 Claims, 7 Drawing Sheets

(56) References Cited

OTHER PUBLICATIONS

Natsume, et al., "RSGAN: Face Swapping and Editing using Face and Hair Representation in Latent Spaces", In Journal of Computing Research Repository, Apr. 2018, pp. 1-26.

Shen, et al., "Image Based Hair Segmentation Algorithm for the Application of Automatic Facial Caricature Synthesis" In the Scientific World Journal, Jan. 29, 2014, pp. 1-10.

Yu, et al., "Algorithm for Face Detection Combining Geometry Constraints and Face-Mask", In Information Technology Journal, vol. 12, Jun. 12, 2013, pp. 1406-1411.

Zhang, et al., "Detailed, accurate, human shape estimation from clothed 3D scan sequences", In Proceedings of the IEEE Conference on Computer Vision and Pattern Recognition, Jul. 21, 2017, pp. 4191-4200.

\* cited by examiner ical Description provided below in connection
FITTING 3D MODELS OF COMPOSITE OBJECTS

BACKGROUND

Composite objects such as human faces, people, vehicles, animals and others, are objects made up of more than one class of element. In the case of a vehicle, the vehicle is made up of various classes of element including a body of the vehicle, dirt or grease on the surface of the vehicle, accessories added to the vehicle such as luggage pods, cycle racks, ski racks. A human face is also an object made up of more than one class of element including but not limited to: skin, hair, jewelry, clothing, spectacles.

Computer graphics and image processing technologies for generating virtual images of objects typically use three-dimensional (3D) models of the type of object being generated. The 3D model is typically a generic model for the type of object. In order to use the 3D model to render images of the object, the 3D model has to be made suitable for a particular example of the object. One way to achieve this is to capture sensor data depicting the object and use the captured data to fit the 3D model. The process of fitting the 3D model involves computing values of parameters of the 3D model such as pose (3D position and orientation) and shape parameters.

The embodiments described below are not limited to implementations which solve any or all of the disadvantages of known ways of fitting 3D models.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a method of fitting a 3D model to input data. Input data comprises a 3D scan and associated appearance information. The 3D scan depicts a composite object having elements from at least two classes. A texture model is available which when given an input vector computes, for each of the classes, a texture and a mask. A 3D model of shape of a target class is available. A joint optimization is computed to find values of the input vector and values of parameters of the 3D model, where the optimization enforces that the 3D model, when instantiated by the values of the parameters, gives a simulated texture which agrees with the input data in a region specified by the mask associated with the 3D model; such that the 3D model is fitted to the input data.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present examples are constructed or utilized. The description sets forth the functions of the example and the sequence of operations for constructing and operating the example. However, the same or equivalent functions and sequences may be accomplished by different examples.

The term "texture" is a term in the art of computer graphics and image processing and refers to a two-dimensional (2D) image depicting colour or other surface attributes to be applied to a three-dimensional (3D) model of an object.

The term UV space refers to the two axes U and V that span a texture.

The term "mask" is a term in the art of computer graphics and image processing and refers to a 2D image of values in the interval [0,1] that indicate a degree in which a given image element is part of a particular class or not.

Although the present examples are described and illustrated herein as being implemented in a model fitter used with human faces, the system described is provided as an example and not a limitation. As those skilled in the art will appreciate, the present examples are suitable for application in a variety of different types of model fitting systems including with other types of composite object including but not limited to: people, animals, buildings, vehicles.

One of the common issues when fitting a face model to a face scan is that the scan might contain features that are not part of the model. Examples of such features include facial hair, head hair, eyebrows, glasses. Face model fitters will often attempt to deform the model to explain those features, resulting in a poor, unrealistic fit. One solution for this is to manually clean every scan to remove the non-modelled features, which is very costly. Another approach is to use a robust fitting metric, but that introduces bias and requires significant tuning to achieve comparable results. The same problems arise for other types of composite object such as people, animals, vehicles, human hands.

Figure 1:
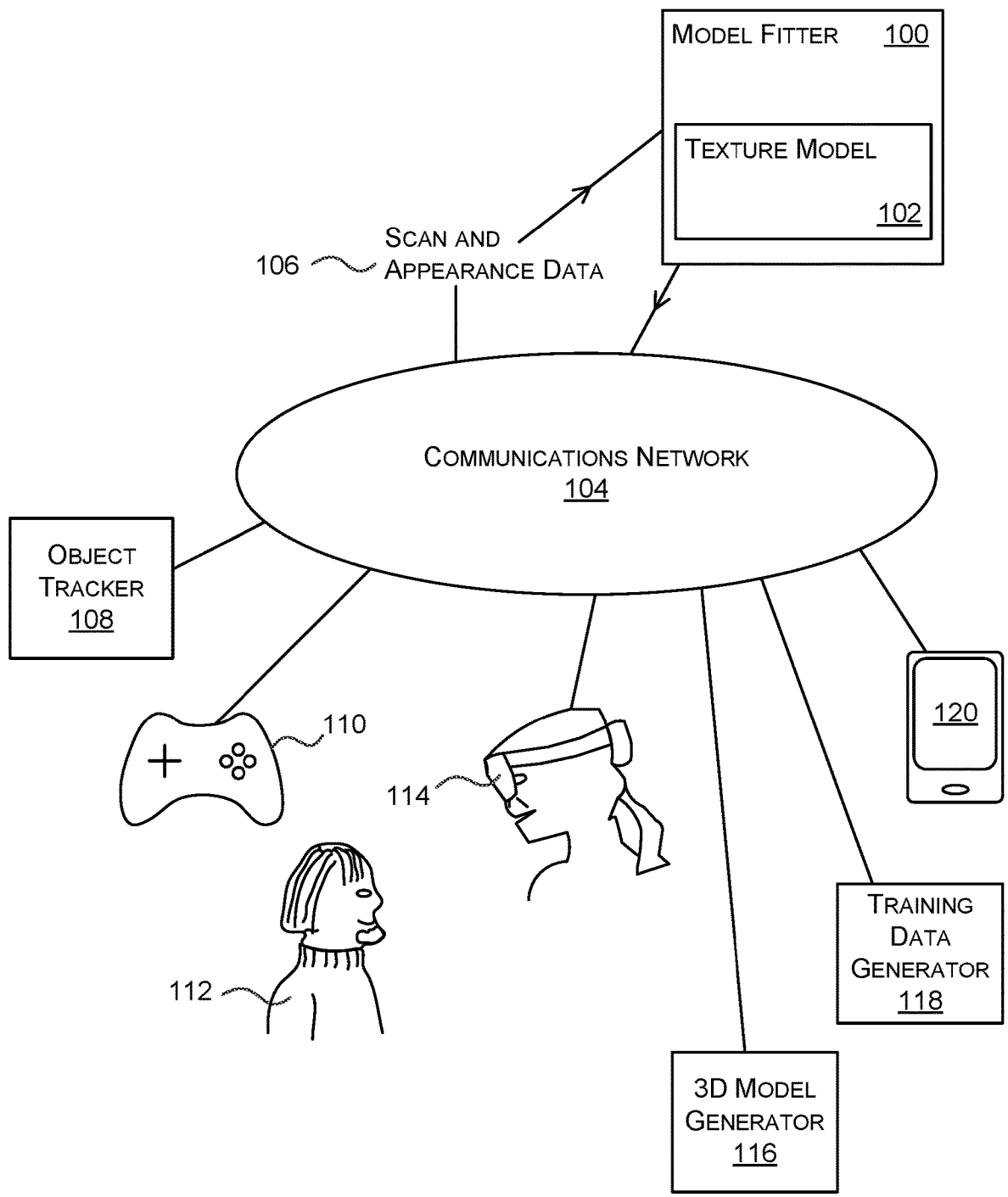
FIG. 1 is a schematic diagram of a model fitter deployed as a cloud service.

FIG. 1 is a schematic diagram of a model fitter 100 deployed as a web service. The model fitter 100 comprises a texture model 102 described in more detail below. The texture model 102 enables different classes of element of composite objects depicted in input data to be segmented. The segmentation is computed as part of the model fitting process and the result is improved accuracy and quality of model fitting since the different segments are treatable differentially. In an example, the segmentation enables features such as facial hair, eyebrows, glasses to be accommodated so the model fitting process is improved. The model fitter 100 receives input data 106 comprising scan and appearance data depicting a composite object. A non-exhaustive list of examples of types of scan data is: depth map, point cloud, triangle mesh. A non-exhaustive list of examples of sources of scan data is: laser range scanner, time of flight camera. A non-exhaustive list of examples of appearance data is: colour video, colour image, texture of a 3D mesh. The model fitter has access to one or more 3D models for at least one class of element of a type of composite object. In an example where the composite object is a face, the 3D models include 3D models of face shape. In an example where the composite object is a vehicle, the 3D models include 3D models of vehicle shape. The 3D models are parameterized where the parameters include shape parameters. The 3D models optionally have pose parameters and/or texture parameters. Pose parameters include position and orientation. Initially (before fitting), parameters of the 3D models are set to default values or values determined by a separate initialization process.

Figure 6:
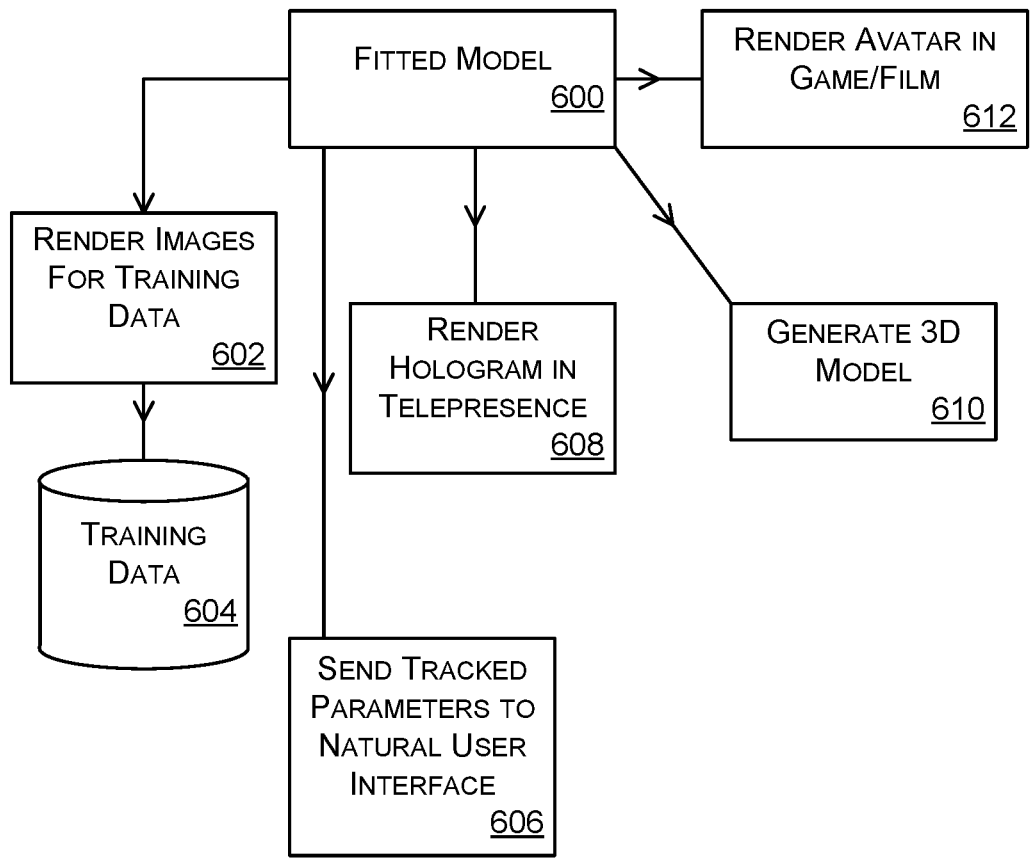
FIG. 6 is a flow diagram of using a fitted model for various tasks.

The output of the model fitter is a fitted 3D model which is the 3D model with values of the parameters which have been computed such that the 3D model corresponds with the input data as far as possible. The fitted 3D model is useful for a wide variety of tasks some of which are illustrated in FIG. 1 and FIG. 6. The output of the model fitter also includes the output of the texture model which is, for each class of element of the composite object, a mask; and a plurality of texture images in UV space, one for each of the classes of element of the composite object.

FIG. 1 shows the model fitter deployed as a web service at one or more computing resources in the cloud and in communication, via communications network 104 with one or more client devices. In an example, a client device is a head-worn mixed reality computing device 114 and the model fitter is used as part of a process to render a virtual image of a face of a person 112 as part of a telepresence function. In another example a client device is a game apparatus 110 which uses the fitted model to render a virtual object in a computer game. In another example a client device is an object tracker 108 which tracks objects depicted in incoming sensor data such as to track the position, orientation and shape of hands of a person to enable control of a natural user interface. In another example, a client device is a 3D model generator 116 which generates 3D models of objects from scan data and uses the model fitter as part of its processing. In another example a client device is a training data generator, which uses the fitted model to render images and generate training data. In another example, the client device is a smart phone 120 incorporating an object tracker or telepresence function. The client devices illustrated in FIG. 1 are examples and other types of client device are used in other examples.

It is not essential to deploy the model fitter as a web service. In some cases the model fitter is deployed at a client device.

The functionality of the model fitter is shared between the cloud computing resources and the client computing device in some cases.

The model fitter operates in an unconventional manner to achieve the highly accurate model fitting of the disclosure.

The model fitter improves the functioning of the underlying computing device by computing a joint optimization of parameters of a 3D model and a texture model.

Alternatively, or in addition, the functionality of the model fitter is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2:
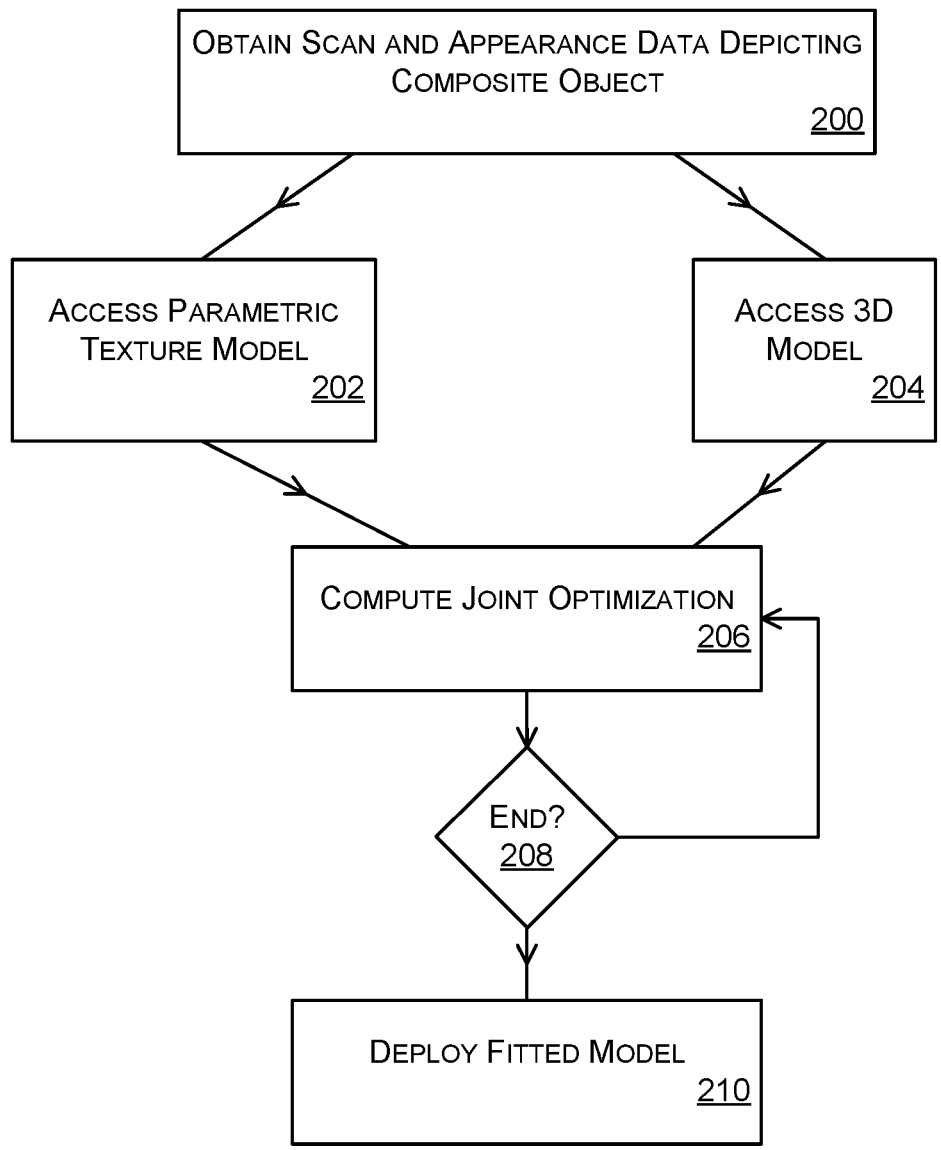
FIG. 2 is a flow diagram of a method of operation of a model fitter.

FIG. 2 is a flow diagram of a method of operation at a model fitter such as that of FIG. 1. Scan and appearance data is obtained 200 depicting a composite object. The scan and appearance data is obtained from one or more capture devices and examples of scan and appearance data are given with reference to FIG. 1 above. The model fitter accesses 202, 204 a texture model and a 3D model.

The texture model has parameters comprising an vector expressed as a vector. The vector is a point in a multi-dimensional latent space z of an autoencoder as described with reference to FIG. 4 below. The texture model has already been trained and only the decoder part of the autoencoder is used during operation of the method of FIG. 2. Detail about how the texture model is trained is given later in this document. When the decoder receives an vector as input it computes for each class of element of the composite object, a UV texture image and a mask. In order to use the decoder to generate masks and UV texture images for a particular scan and appearance data input, the model fitter has to decide what values to put into the vector. The model fitter does this as part of a joint optimization as now described.

The 3D model accessed at operation 204 is a shape model of a target class among the classes of elements that compose an object. In an example the target class is skin and the composite object is a human face. In another example the target class is metal body and the composite object is a vehicle. The 3D model has parameters comprising shape parameters and optionally pose parameters. Any suitable form for the 3D model is used such as a polygon mesh, a smooth surface rigged 3D model, or other 3D model.

The model fitter seeks values of the parameters of the 3D model and the parameters of the texture model which enable the observed scan and appearance data from operation 200 to be explained. The model fitter therefore computes a joint optimization of both the parameters of the 3D model and the parameters of the texture model. The optimization includes terms to enable parts of the observed scan and appearance data which depict non-target class elements (as determined using the masks) to be given less weight where appropriate. In this way the accuracy of the fitted model at the end of the process of FIG. 2 is high since the non-target class elements are less likely to inappropriately deform the 3D model. The joint optimization is an iterative process which begins with random or default values of the parameters for both the texture model and the 3D model. In some examples the initial values of the parameters are set using a separate initialization process. As the iterations proceed the values of the parameters gradually become better at explaining the observed data.

Fitting a model to scan data is formulated as an optimization problem where the texture model and 3D model parameters are optimization variables and the optimization function, or loss, measures how well the model can explain the scan data. The method of FIG. 2 modifies the loss used in model fitting to be able to ignore non-target classes of elements in a scan and focus the fit only on the parts of the scan that are compatible with the model. To improve readability, the following paragraphs assume the non-target class elements are hair. However, these paragraphs also apply for other types of non-target class element.

A loss contains a data term that penalizes differences between the model and the scan and a regularization term that measures how likely the model parameters are. Each of these terms has a weight associated with it that indicates how much influence it has on the fit.

Given a mask indicating which parts of the scan texture are hair, use this mask to modify the loss by allowing the model to ignore the data in hair regions and instead default to a default value of the model in those regions. This is achieved, for example, by down-weighting the data terms of the loss in hair regions and introducing an additional regularization term that forces the model to be close to a default in hair regions. This prevents the model fitter from deforming the model into unlikely configurations due to hair and instead fit to the default because the data term of the loss has a low weight, while the new regularization term encourages the loss to deform the model to fit to the template face. In non-hair regions, the data term has a high weight while the new regularization term has a low or zero weight and the loss encourages the fitter to deform the model to fit to the data.

In some examples the loss incorporates information on the expected deformations caused by hair by only ignoring scan data if it lies within the hair mask and in the outward normal directions with respect to the head surface.

The segmentation method used in the process of FIG. 2 is generative in contrast to alternative semantic face parsing methods. During fitting, the parameters of the texture model are optimized jointly with a shape model and as shape improves, so does the texture estimate, which in turn improves the estimate of the feature-separating mask. The discriminative nature of alternative semantic face parsing methods means that only a single estimate of the mask will be generated and no improvements will be made during fitting.

Moreover, the method of FIG. 2 generates a mask in UV space, while semantic face parsing methods work in image space. The UV-space mask facilitates fitting to 3D data. For example, if one were to use semantic face parsing to perform segmentation on a full scan of a human head, several renders of the scan would first need to be generated to cover all sides of the head. The renders would then all need to be processed by semantic face parsing, which does not return consistent results in overlapping regions. The present technology uses UV-map segmentation which simplifies this by covering the entire space of the model in a single mask.

In an example two layers are output by the texture model, each output texture having a corresponding mask as follows: ($T^0$, $M^0$) and ($T^1$, $M^1$). In this case, a final texture is obtained as $$T=M^0*T^0+(1-M^0)*T^1 \quad \text{(equation 1)}$$

because the mask $M^1=1-M^0$. Both T and M parametrize the texture of an object in uv-space, that is $$M^i:[0,1]^2 \to [0,1] \quad \text{(equation 2)}$$

$$(u,v) \mapsto M(u,v), \quad \text{(equation 3)}$$

where $M^i(u, v)$ is the value of the mask at the 3D point of the shape model with uv-coordinates (u, v). Similarly $$T^i:[0,1]^2 \to [0,255]^3 \quad \text{(equation 2)}$$

$$(u,v) \mapsto T(u,v), \quad \text{(equation 3)}$$

where T (u, v) is the red green blue (RGB) value of the texture at the 3D point of the shape model with uv-coordinates (u, v). The mapping from uv coordinates to 3D points in a mesh is part of the shape and appearance model, it is fixed and known. Using this parametrization is an efficient way to store texture information for a 3D model because the texture information is parametrized in two dimensions in a uniform domain and can be stored, learned, and processed as images.

A parametric shape and appearance model $S(\theta,z)$ is specified for the class of objects of interest, where the parameters $\theta$ control the 3D shape of the object with a function $S(\theta)$ that creates a mesh for each instance of model parameter B and the parameter z controls its appearance by a function $T(z)$ that generates texture images $T,T^0$ and mask $M^0$ that parametrize the texture of the 3D mesh in uv-space. The texture function corresponds to the decoder of the texture model described herein, the texture parameter z to its latent space, and $M^0$, $MT^0$, T satisfy Equation 1.

A task is to fit the parametric shape and appearance model to 3D scans described by a set of 3D points $x_1, \ldots, x_n$ with appearance information $a_1, \ldots, a_n$. Some of these points correspond to an object of interest, while other points correspond to object classes that are not modelled. The base layer $T^0$ describes the texture of the class of objects of the parametric shape and appearance model $S(\theta,z)$ and the mask $M^0$ describes where this texture model is active. As a result, given an input scan, a fitter uses $M^0$ to determine which points of the input scan need to be matched to the model and $T^0$ to model the appearance of the object at each point that corresponds to the object of interest.

Formulate the fitting as a minimization problem, where the optimization variables are the parameters $\theta$, z and the correspondences between input points and the corresponding points in the mesh model $S(\theta,z)$. Use uv coordinates to define these correspondences and associate a uv coordinate pair $(u_i, v_i)$ to each input point $x_i$ in the scan. To simplify notation, denote the set of these coordinates as $\mathcal{U} = \{(u_1, v_1), \ldots, (u_n, v_n)\}$ and by $S(\theta, u_i, v_i)$ the 3D point in the mesh $S(\theta)$ with uv coordinates $(u_i, v_i)$. The objective function or loss of the optimization problem defines the goal: find the model parameters and correspondences that best explain the observed data. The model fitter 100 measures how well the model fits the input data with the following loss:

$$\sum_{i=1}^{n} M^0(u_i, v_i)\left[|S(\theta, u_i, v_i) - x_i|^2 + |T^0(u_i, v_i) - a_i|^2\right] +$$

$$\sum_{i=1}^{n} (1 - M^0(u_i, v_i))\left[|S(\theta, u_i, v_i) - S(\theta^0 u_i, v_i)|^2 +\right.$$

$$\left.|T(u_i, v_i) - a_i|^2\right] + \mathcal{R}(\theta, z),$$

where $\mathcal{R}(\theta,z)$ is a regularization function that solves indeterminations and $S(\theta^0)$ is a base template of the geometry of the object class of interest. At points where the scan fits well the object of interest, the mask $M^0(u_i, v_i)$ is close to 1 and the loss function finds model parameters that explain the input data with the first term in the loss. At points where the mask indicates that the data is not about the object of interest, $M^0(u_i, v_i)$ is close to zero and the loss matches the model geometry in those regions to a base template mesh $S(\theta^0,z^0)$ that explains in average the object of interest in those regions and the appearance of the input point to the texture model T that accounts for the combined texture of the model and other surfaces in the scene which are not the object of interest.

During fitting, the model fitter 100 jointly estimates the geometry of the object, its texture, and the areas that are part of the object of interest in the scan by solving the following optimization problem:

$$\min_{\theta, z, \mathcal{U}} \ell(\theta, z, \mathcal{U}).$$

Solving jointly for texture, geometry, and a mask that determines which parts of the scan are part of the object of interest and which parts of the scan depict regions which are not the object of interest gives accurate results. Alternative methods are less accurate and involve pre-computing the mask only form the input texture and do not optimize for it using also geometry information, or making a generic mask that is used for all input scans. In the present technology there is a different mask estimated for each input scan to better adapt to the data.

Figure 3:
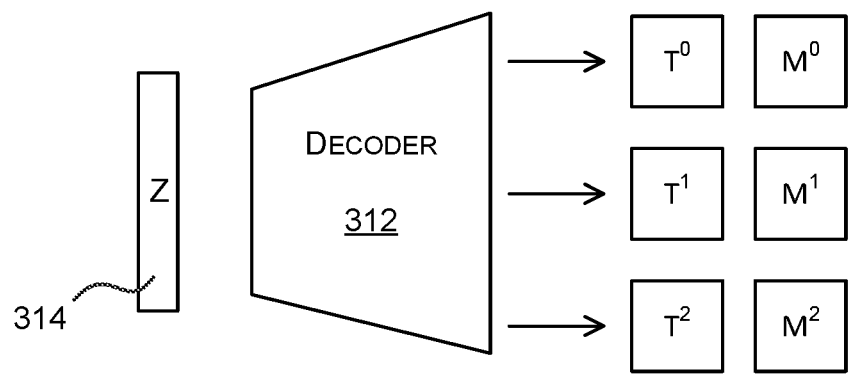
FIG. 3 is a schematic diagram of a texture model, textures and masks.
Figure 3:
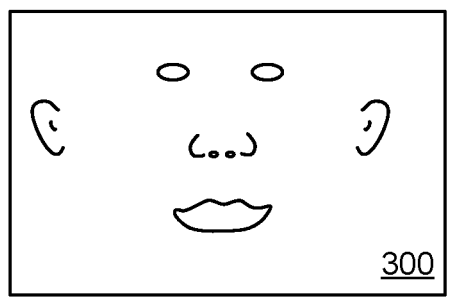
Figure 3:
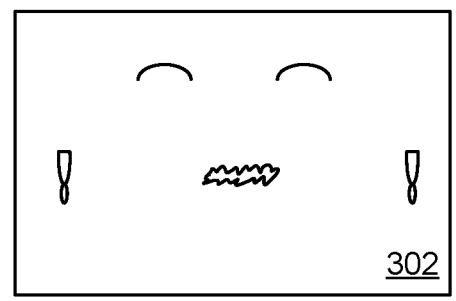
Figure 3:
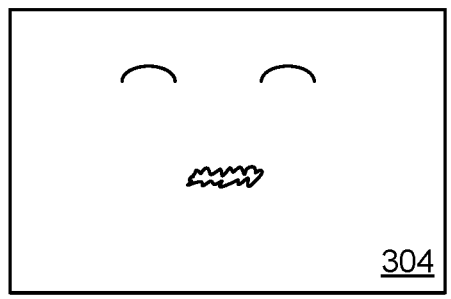
Figure 3:
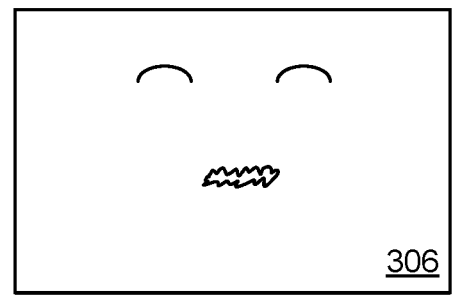
Figure 3:
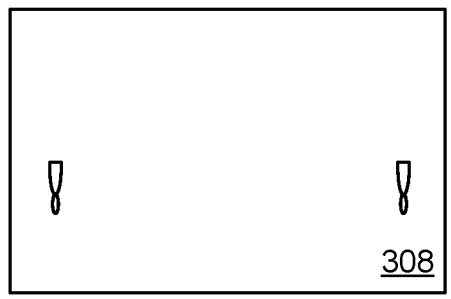
Figure 3:
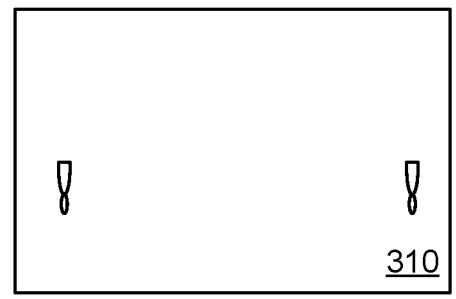

FIG. 3 is a schematic diagram of a texture model such as that of FIG. 1 and that used in FIG. 2. It comprises a decoder 312 which takes as input a vector 314 in a latent space z and it computes as output a plurality of texture images $T^0, T^1, T^2$ and corresponding masks $M^0, M^1, M^2$. In the example of FIG. 3 there are three texture images and three masks. However, it is possible to use two texture images and two masks, or more than two texture images and masks.

To aid understanding of the technology, FIG. 3 gives schematic representations of the texture images and the masks. Texture images 300, 304 and 308 are on the left hand side and corresponding masks 302, 306, 310 are on the right hand side. In this example texture image 300 depicts skin of a person's face, texture image 304 depicts facial hair of the person's face and texture image 308 depicts jewelry of the person's face. The mask 302 comprises values which segment the hair and jewelry and enable the facial hair and jewelry to be removed. The mask 306 has values which segment the hair and enable the facial hair to be removed. The mask 310 has values which segment the jewelry.

Figure 4:
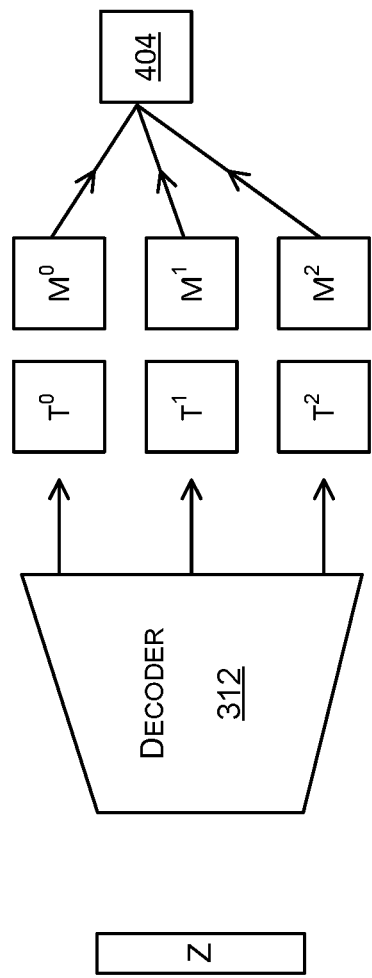
FIG. 4 is a schematic diagram of an auto encoder.
Figure 4:
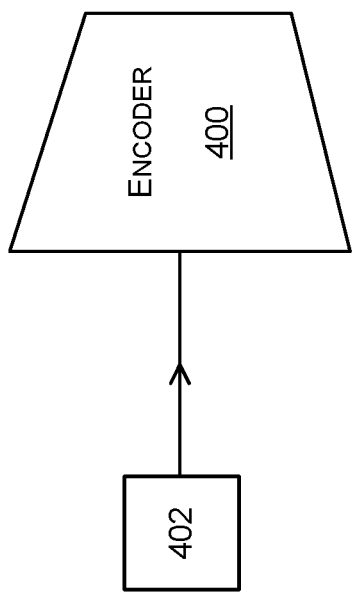

FIG. 4 is a schematic diagram of an autoencoder comprising the decoder 312 of the texture model. During training the decoder 312 is part of an autoencoder such as that of FIG. 4 and once trained, the encoder 400 is discarded.

The auto-encoder is a standard auto-encoder or a variational autoencoder both of which are commercially available types of neural network. The encoder 400 receives as input appearance data such as a complete texture which is in the form of an image 402. The word "complete" means that the texture has not yet been separated into layers, one per class of element of the composite object. The encoder 400 computes an vector of the appearance data into a latent space z and the vector is in the form of a vector. The decoder 312 takes the vector z as input and computes a mapping from the vector to a plurality of texture images in UV space and a plurality of masks. A weighted combination of the texture images is computed as illustrated in FIG. 4 to give an output image 404. During training an aim is to have the output image 404 be as close as possible to the input appearance texture image 402.

Figure 5:
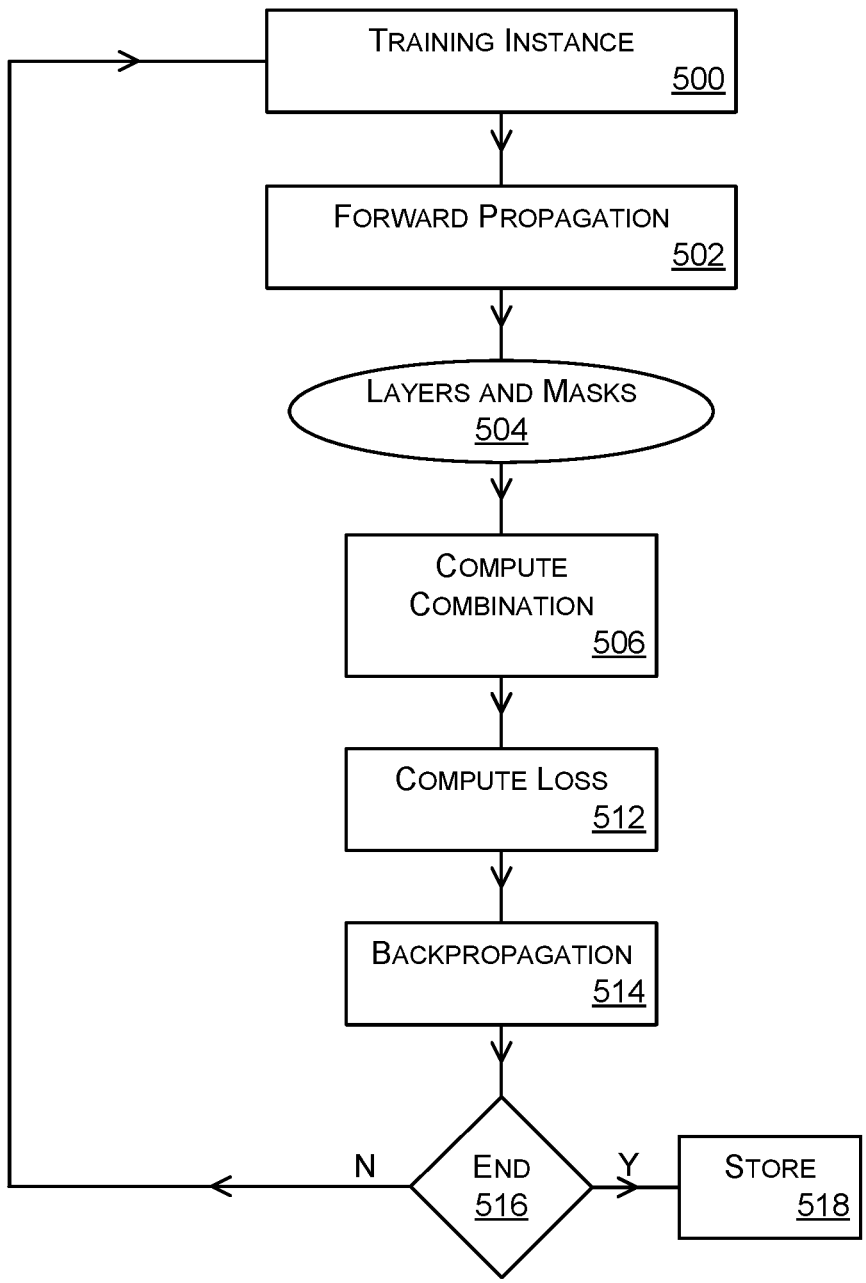
FIG. 5 is a flow diagram of a method of training a texture model.

More detail about how the autoencoder is trained is now given with reference to FIG. 5. Training data is available which is a plurality of complete textures where some but not all of the complete textures have been manually divided into layers by a human. The complete textures which have been manually divided into layers are referred to as ground truth complete textures.

The training process takes a training instance at operation 500 where the training instance is a ground truth complete texture or in some cases is a complete texture where no separation into layers is available in advance. The following notation is used:

$T_{GT}$—ground truth complete texture
$T_{GT}^i$—ground truth i-th layer
$k_i \in \{0,1\}$—is 1 if $T_{GT}^i$ is available for a given $T_{GT}$, 0 otherwise
$T^i$—texture model output, i-th layer
$M^i$—texture model output, weighting mask for i-th layer
$T$—texture model output, the full texture after combining all $T^i$
$n$—number of texture layers
$\Theta$—a loss function that penalizes the difference between two textures
$\circ$—Hadamard (element-wise) product of two matrices The training instance from operation 500 is input to the autoencoder and a forward propagation is computed 502 through the encoder and the decoder to enable textures (referred to as layers of a complete texture) and masks to be computed 504.

A weighted combination 506 of the textures is computed with the weights determined according to the masks. A loss is computed 512 and backpropagation used to update weights in the encoder and decoder. A check 516 is made whether to end training and if so the decoder is stored 518 and the encoder discarded. The check 516 involves checking one or more of: whether a specified number of training instances have been used, whether the loss is below a threshold, whether a specified time has elapsed. Where the check 516 indicates that training is to continue, the process returns to operation 500 for another training instance.

In an example the loss function computed at operation 512 is expressed as:

$$L = \Theta(T_{GT}, T) + \sum_{i=0}^{n} k_i \Theta(T_{GT}^i, T^i),$$

where $$T = \frac{\sum_{i=0}^{n} M^i \circ T^i}{\sum_{i=0}^{n} M^i}$$

The loss function above is expressed in words as a loss L is equal to a measure of the difference between a ground truth complete texture input and the combined weighted texture computed from the outputs of the autoencoder weighted by the masks, plus the sum over texture layers of a measure of the difference between a ground truth texture layer and a corresponding texture layer computed by the decoder. A benefit of the loss function is that it enables training both with training inputs that have ground truth information about the corresponding layers and with ones that do not. Since ground truth training data is expensive and time consuming to obtain this is a significant benefit.

In an example, the loss used to train the texture model comprises losses that force the combined output texture to be close to the input texture.

In an example the loss used to train the texture model also comprises a loss that forces the target class elements (skin in the example above) to be close to a clean texture that corresponds to the input texture. If the input texture does not have a clean texture, this loss is not used. This loss encourages the mask to separate the areas where the non-target classes are present.

The latent space z of the texture model is optionally split into a part that corresponds to the non-target class elements and a part that corresponds to the rest of the texture. The first part is used to generate a mask and non-target class element texture. The second part of the latent space is used to generate the target class texture.

This design allows for separately sampling target and non-target class elements. This, in turn, allows for creating combinations of those elements that have not been seen in the training set. The resulting texture model can thus generalize to more combinations of target class elements and non-target class elements. In an example this corresponds to more combinations of hair and skin textures FIG. 6 is a schematic diagram of methods of using the fitted model obtained from the process of FIG. 2.

The fitted model 600 is used in some cases to render 612 an avatar in a game or film. Given a 3D reconstruction of a person's head it is often desirable to fit a deformable 3D model to that reconstruction. Since the fitted model is deformable, it can be used to animate the head. This is used in computer games, where a famous person's head is scanned and then animated in the computer game.

The fitted model can also be used for generating synthetic training data 604 used in machine learning. The fitted model can be rendered 602 with varying pose and expression and very accurate ground truth annotations can be extracted from each frame. Such accurate 3D ground truth is often impossible to obtain through manual annotation.

The fitted model 600 is also used in tracking such as face tracking. The process of FIG. 2 improves the accuracy of fitting the model to images from a depth camera, for example the Azure Kinect (trade mark). Such fitting allows for tracking the facial features/pose/expression of people seen by the camera. The fitted model is used for hand tracking in some examples. The tracking data 606 is sent to a natural user interface to enable control of a computing device in some examples.

In some examples the fitted model 600 is used to render 608 a hologram to display a virtual avatar in a telepresence application.

Where scan data is available, such as from camera rigs, the fitted model 600 is used as part of a process 610 to generate a 3D model of an object depicted in the scan data. In an example, a person is able to scan themselves using a Kinect (trade mark) camera and create a digital twin of the person for use in telepresence applications.

Figure 7:
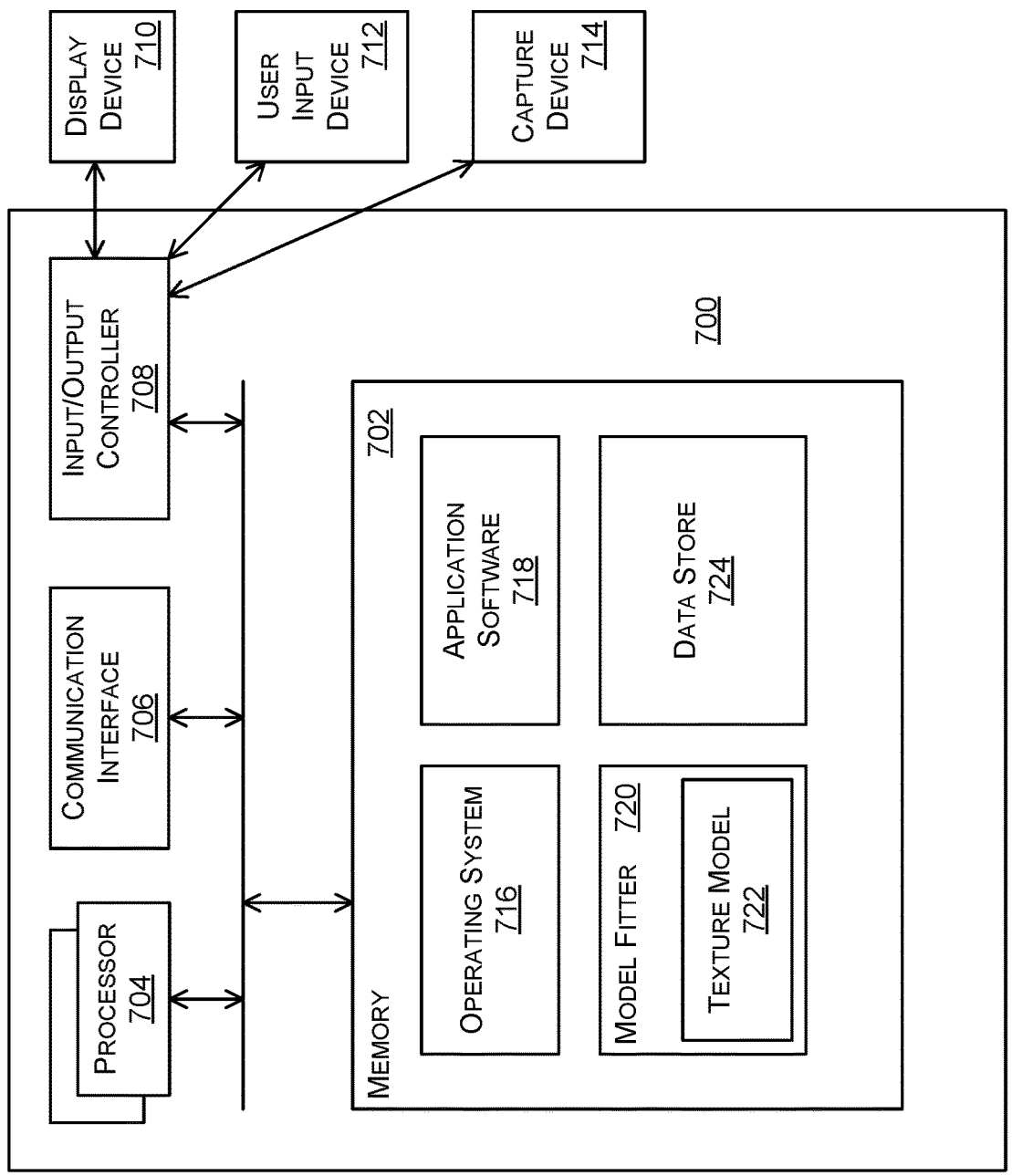
FIG. 7 illustrates an exemplary computing-based device in which embodiments of a model fitter are implemented.

FIG. 7 illustrates various components of an exemplary computing-based device 700 which are implemented as any form of a computing and/or electronic device, and in which embodiments of a model fitter are implemented in some examples.

Computing-based device 700 comprises one or more processors 704 which are microprocessors, controllers or any other suitable type of processors for processing computer executable instructions to control the operation of the device in order to fit a 3D model to scan data. In some examples, for example where a system on a chip architecture is used, the processors 704 include one or more fixed function blocks (also referred to as accelerators) which implement a part of the method of any of FIGS. 2 and 5 in hardware (rather than software or firmware). Platform software comprising an operating system 716 or any other suitable platform software is provided at the computing-based device to enable application software 718 to be executed on the device such as a telepresence application, video conferencing application, natural user interface, machine learning training application, object tracking application or other application. A model fitter 720 is present at the computing-based device such as the model fitter 720 described herein. The model fitter 720 comprises a texture model 722.

The computer executable instructions are provided using any computer-readable media that is accessible by computing based device 700. Computer-readable media includes, for example, computer storage media such as memory 702 and communications media. Computer storage media, such as memory 702, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 702) is shown within the computing-based device 700 it will be appreciated that the storage is, in some examples, distributed or located remotely and accessed via a network or other communication link (e.g. using communication interface 706).

The computing-based device 700 also comprises an input/output controller 708 arranged to output display information to a display device 710 which may be separate from or integral to the computing-based device 700. The display information may provide a graphical user interface to show parameter values of fitted models, masks, textures or other data. The input/output controller 708 is also arranged to receive and process input from one or more devices, such as a user input device 712 (e.g. a mouse, keyboard, game console, camera, microphone or other sensor). In some examples the user input device 712 detects voice input, user gestures or other user actions and provides a natural user interface (NUI). In an embodiment the display device 710 also acts as the user input device 712 if it is a touch sensitive display device. The input/output controller 708 outputs data to devices other than the display device in some examples, e.g. a locally connected printing device, a renderer, a computer game apparatus, a telepresence apparatus.

Any of the input/output controller 708, display device 710 and the user input device 712 may comprise natural user interface (NUI) technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively or in addition to the other examples described herein, examples include any combination of the following:

A computer-implemented method of decomposing an input UV texture map image of a composite object composed of elements in a plurality of classes, into two or more layers, each layer being a UV texture map image depicting one of the classes, the method comprising:
inputting the UV texture map to an encoder to compute an vector;
using a decoder to map the vector into each of the layers and to compute, for each layer, a mask.

A computer-implemented method as described in the previous paragraph wherein the encoder and decoder have been trained using a loss function which encourages both that a combination of the layers, weighted according to the masks, corresponds to the input UV texture map image, and the layers are the same as corresponding ground truth layers.

The computer-implemented method of either or both of the previous two paragraphs wherein the vector is formed of a plurality of parts, each part corresponding to one of the layers.

A computer-implemented method of learning a texture model that decomposes an input UV texture map image of a composite object into two or more layers, each layer being a UV texture map image depicting the method comprising:
accessing training data comprising a plurality of textures of composite objects composed of elements in a plurality of classes, where some but not all of the textures have been decomposed into two or more ground truth layers with one ground truth layer per class;
training a model to map a texture to a vector and then map the vector into images of each of the layers, and to compute for each layer a mask;
wherein training the model comprises using a loss function which encourages both that a combination of the layers, weighted according to the masks, corresponds to the input UV texture map image, and the layers are the same as the corresponding ground truth layers.

Clause A A computer-implemented method comprising: accessing input data comprising: a 3D scan and associated appearance information, the 3D scan depicting a composite object having elements from at least two classes;
accessing, from a memory, a texture model which, given an input vector computes, for each of the classes, a texture and a mask;
accessing a 3D model being a shape model for a target class among the classes of elements that compose the object and having an associated mask from the texture model;
computing a joint optimization to find values of the input vector and values of parameters of the 3D model, where the optimization enforces that the 3D model, instantiated by the values of the parameters, gives a simulated texture which is similar to the input data in a region specified by the mask associated with the 3D model; such that the 3D model is fitted to the input data. In this way the 3D model is fitted to the input data with improved accuracy. The joint optimization enables good masks and good model fitting to be computed together and the masks enable parts of the textures to be less influential in order to prevent them inappropriately deforming the 3D model.

Clause B The computer-implemented method of clause A further comprising using the fitted 3D model for one or more of: generating a virtual object using a mixed-reality computing device, rendering images of the composite object to generate training images, tracking the composite object as part of a natural user interface, generating a virtual object in a computer game, generating a virtual object in a film, generating a 3D model of an object. In this way useful applications are achieved for a variety of tasks.

Clause C The computer-implemented method of any preceding clause wherein each mask is a separating mask which separates elements of one of the classes of element of the composite object from the other classes of element. By computing separating masks the model fitter is able to control the influence of different classes of element on the model fitting process.

Clause D The computer-implemented method of any preceding clause wherein the joint optimization reduces the influence of elements outside the target class according to the masks. In this way a target class is fit to the 3D model in a high quality, high accuracy manner.

Clause E The computer-implemented method of any preceding clause wherein the joint optimization comprises down weighting data terms of a loss in regions depicting elements outside the target class according to the masks, and introducing a regularization term which encourages the 3D model to be close to a default in regions outside the target class. Using down weighting of data terms and a regularization term is found to be an efficient and effective way to implement the model fitting.

Clause F The computer-implemented method of any preceding clause wherein the joint optimization ignores the scan data corresponding to regions identified in masks for classes outside the target class. Ignoring parts of the scan data where appropriate is found to improve the quality of the fitted model.

Clause G The computer-implemented method of any preceding clause wherein the joint optimization is computed using an iterative process whereby the masks are updated as part of the iterative process. In this way the accuracy and quality of the masks improves over the iterations and facilitates the joint optimization.

Clause H The computer-implemented method of any preceding clause wherein the texture model is a decoder of an auto-encoder, where the autoencoder has been trained to decompose UV texture map images of composite objects into two or more layers and to compute, for each layer, a mask. Using the decoder of an autoencoder as the texture model is found to work well in practice and also enables the decoder to be trained effectively when it is part of the autoencoder.

Clause I The computer-implemented method of any preceding clause wherein the texture model has been trained using a loss function which enforces both that a combination of the layers, weighted according to the masks, corresponds to the input UV texture map image, and the layers are the same as corresponding ground truth layers where available.

Using a loss function with these characteristics is found to be particularly effective and efficient.

Clause J The computer-implemented method of any preceding clause comprising training the texture model by using a loss function which enforces both that a combination of the layers, weighted according to the masks, corresponds to the input UV texture map image, and the layers are the same as corresponding ground truth layers where available. Training the texture model in this way gives good results.

Clause K The computer-implemented method of clause J wherein the texture model is trained using training data comprising a plurality of textures of composite objects composed of elements in a plurality of classes, where some but not all of the textures have been decomposed into two or more ground truth layers with one ground truth layer per class. In this way effective training is enabled without having to obtain large amounts of textures with ground truth layers which are expensive to obtain.

Clause L The computer-implemented method of clause J comprising training the texture model to map a texture to a vector and then map the vector into images of each of the layers, and to compute for each layer a mask.

Clause M The computer-implemented method of any preceding clause wherein the composite object is a face and the classes of element comprise at least skin and hair. In the case that the composite object is a face the method is particularly effective since human faces typically comprise many classes of object, such as facial hair, jewelry, clothing, spectacles, which influence model fitting significantly and which are difficult to segment away from the skin without detriment.

Clause N An apparatus comprising:
at least one processor; and
a memory for storing and encoding computer executable instructions, that, when executed by the at least one processor is operative to:
access input data comprising: a 3D scan and associated appearance information, the 3D scan depicting a composite object having elements from at least two classes;
access a texture model which, given an input vector computes, for each of the classes, a texture and a mask;
access a 3D model being a shape model for a target class among the classes of elements that compose the object and having an associated mask from the texture model;
compute a joint optimization to find values of the input vector and values of parameters of the 3D model, where the optimization encourages that the 3D model, when instantiated by the values of the parameters, gives a simulated texture which is similar to the input data in a region specified by the mask associated with the 3D model; such that the 3D model is fitted to the input data.

Clause O The apparatus of clause N integral with a mixed-reality, head-worn computing device.

Clause P The apparatus of clause N wherein the instructions are operative to render images from the fitted 3D model to generate a hologram of the composite object.

Clause Q The apparatus of clause N wherein the instructions are operative to render images from the fitted 3D model as part of a renderer in a computer game.

Clause R The apparatus of clause N wherein the instructions are operative to render images from the fitted 3D model as part of a natural user interface.

Clause S The apparatus of clause N wherein the instructions are operative to render a plurality of images from the fitted 3D model to form training data.

Clause T One or more device-readable media with device-executable instructions that, when executed by a computing system, direct the computing system to perform for performing operations comprising:
accessing input data comprising: a 3D scan and associated appearance information, the 3D scan depicting a face of a person comprising skin and hair;
accessing, from a memory, a texture model which given an input vector computes, for each of skin and hair, a texture and a mask;
accessing a 3D model being a shape model for a skin and having an associated mask from the texture model;
computing a joint optimization to find values of the input vector and values of parameters of the 3D model, where the optimization encourages that the 3D model, when instantiated by the values of the parameters, gives a simulated texture which is similar to the input data in a region specified by the mask associated with the 3D model; such that the 3D model is fitted to the input data.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The methods herein, which involve the observation of people in their daily lives, may and should be enacted with utmost respect for personal privacy. Accordingly, the methods presented herein are fully compatible with opt-in participation of the persons being observed. In embodiments where personal data is collected on a local system and transmitted to a remote system for processing, that data can be anonymized in a known manner. In other embodiments, personal data may be confined to a local system, and only non-personal, summary data transmitted to a remote system.

What is claimed is:

1. A computer-implemented method comprising:
   accessing input data comprising: a three-dimensional (3D) scan and associated appearance information, the 3D scan depicting a composite object having elements from at least two classes;
   accessing, from a memory, a texture model which given an input vector computes, for each of the classes, a texture and a mask;
   accessing a 3D model being a shape model for a target class among the classes of elements that compose the object and having an associated mask from the texture model; and
   computing a joint optimization to find values of the input vector and values of parameters of the 3D model, where the optimization encourages that the 3D model, instantiated by the values of the parameters, gives a simulated texture which is similar to the input data in a region specified by the mask associated with the 3D model; such that the 3D model is fitted to the input data.

2. The computer-implemented method of claim 1 further comprising using the 3D model, instantiated by the values of the parameters, for one or more of:
   generating a virtual object using a mixed-reality computing device, rendering images of the composite object to generate training images, tracking the composite object as part of a natural user interface, generating a virtual object in a computer game, generating a virtual object in a film, generating a 3D model of an object.

3. The computer-implemented method of claim 1 wherein each mask is a separating mask which separates elements of one of the classes of element of the composite object from the other classes of element.

4. The computer-implemented method of claim 1 wherein the joint optimization reduces influence of elements outside the target class according to the masks.

5. The computer-implemented method of claim 1 wherein the joint optimization comprises down weighting data terms of a loss in regions depicting elements outside the target class according to the masks, and introducing a regularization term which encourages the 3D model to be close to a default in regions outside the target class.

6. The computer-implemented method of claim 1 wherein the joint optimization ignores parts of the 3D scan corresponding to regions identified in masks for classes outside the target class.

7. The computer-implemented method of claim 1 wherein the joint optimization is computed using an iterative process whereby the masks are updated as part of the iterative process.

8. The computer-implemented method of claim 1 wherein the texture model is a decoder of an autoencoder, where the autoencoder has been trained to decompose UV texture map images of composite objects into two or more layers and to compute, for each layer, a mask.

9. The computer-implemented method of claim 8 wherein the texture model has been trained using a loss function which enforces both that a combination of the layers, weighted according to the masks, corresponds to the input UV texture map image, and the layers are the same as corresponding ground truth layers.

10. The computer-implemented method of claim 8 comprising training the texture model by using a loss function which enforces both that a combination of the layers, weighted according to the masks, corresponds to the input UV texture map image, and the layers are the same as corresponding ground truth layers.

11. The computer-implemented method of claim 10 wherein the texture model is trained using training data comprising a plurality of textures of composite objects composed of elements in a plurality of classes, where some but not all of the textures have been decomposed into two or more ground truth layers with one ground truth layer per class.

12. The computer-implemented method of claim 10 comprising training the texture model to map a texture to a vector and then map the vector into images of each of the layers, and to compute for each layer a mask.

13. The computer-implemented method of claim 1 wherein the composite object is a face and the classes of element comprise at least skin and hair.

14. An apparatus comprising:
    at least one processor; and
    a memory for storing and encoding computer executable instructions, that, when executed by the at least one processor is operative to:

access input data comprising: a three-dimensional (3D) scan and associated appearance information, the 3D scan depicting a composite object having elements from at least two classes;

access a texture model which, given an input vector, computes, for each of the classes, a texture and a mask;

access a 3D model being a shape model for a target class among the classes of elements that compose the object and having an associated mask from the texture model; and compute a joint optimization to find values of the input vector and values of parameters of the 3D model, where the optimization encourages that the 3D model, instantiated by the values of the parameters, gives a simulated texture which agrees with the input data in a region specified by the mask associated with the 3D model; such that the 3D model is fitted to the input data.

15. The apparatus of claim 14 integral with a mixed-reality, head-worn computing device.

16. The apparatus of claim 14 wherein the instructions are operative to render images from the 3D model instantiated with the values of the parameters to generate a hologram of the composite object.

17. The apparatus of claim 14 wherein the instructions are operative to render images from the 3D model instantiated with the values of the parameters as part of a renderer in a computer game.

18. The apparatus of claim 14 wherein the instructions are operative to render images from the 3D model instantiated with the values of the parameters as part of a natural user interface.

19. The apparatus of claim 14 wherein the instructions are operative to render a plurality of images from the fitted 3D model to form training data.

20. One or more computer storage media having computer executable instructions that, when executed by a computing system, direct the computing system to perform operations comprising:

accessing input data comprising: a 3D scan and associated appearance information, the 3D scan depicting a face of a person comprising skin and hair;

accessing, from a memory, a texture model which, given an input vector, computes, for each of skin and hair, a texture and a mask;

accessing a 3D model being a shape model for a skin and having an associated mask from the texture model; and computing a joint optimization to find values of the input vector and values of parameters of the 3D model, where the optimization computes that the 3D model, instantiated by the values of the parameters, gives a simulated texture which agrees with the input data in a region specified by the mask associated with the 3D model; such that the 3D model is fitted to the input data.

* * * * *